US010907988B2

(12) United States Patent
Kuwamura et al.

(10) Patent No.: US 10,907,988 B2
(45) Date of Patent: Feb. 2, 2021

(54) ROTATION SENSOR HAVING RING-SHAPED RIB

(71) Applicant: Mitsubishi Electric Corporation, Tokyo (JP)

(72) Inventors: Tomoki Kuwamura, Tokyo (JP); Akira Takashima, Tokyo (JP); Hiroshi Fujita, Tokyo (JP); Hideki Shimauchi, Tokyo (JP); Akira Koshimizu, Tokyo (JP)

(73) Assignee: Mitsubishi Electric Cornoration, Tokyo (JP)

( * ) Notice: Subject to any disclaimer, the term of this patent is extended or adjusted under 35 U.S.C. 154(b) by 190 days.

(21) Appl. No.: 15/280,260

(22) Filed: Sep. 29, 2016

(65) Prior Publication Data
US 2017/0299406 A1 Oct. 19, 2017

(30) Foreign Application Priority Data
Apr. 14, 2016 (JP) .................................. 2016-080998

(51) Int. Cl.
*G01D 5/14* (2006.01)
*G01D 11/24* (2006.01)

(52) U.S. Cl.
CPC .............. *G01D 5/145* (2013.01); *G01D 5/147* (2013.01); *G01D 11/245* (2013.01)

(58) Field of Classification Search
CPC .......... G01B 7/30; G01D 5/145; G01D 5/147; G01D 11/245; G01R 33/07; G01R 33/077;
(Continued)

(56) References Cited

U.S. PATENT DOCUMENTS 5,563,510 A * 10/1996 Gorrell ................ G01D 11/245
174/541
6,170,148 B1 * 1/2001 Van Den Berg ....... G01B 7/001
264/272.15
(Continued)

FOREIGN PATENT DOCUMENTS

DE 195 04 820 C1 7/1996
DE 196 12 765 A1 11/1997
(Continued)

OTHER PUBLICATIONS

Communication dated Feb. 7, 2017, from the Japanese Patent Office in counterpart application No. 2016-080998.
(Continued)

*Primary Examiner* — David M Schindler
(74) *Attorney, Agent, or Firm* — Sughrue Mion, PLLC; Richard C. Turner

(57) ABSTRACT

The invention provides a rotation sensor enabling simplification of manufacturing process, such as an inspection step, while maintaining measurement accuracy of the rotation sensor. Lead frames of a rotation sensor have positioning sections which contact a side surface section of a case and, in this state of contact, keep the insertion depth dimension of a magnetism detection unit in the internal space of the case to a prescribed dimension; a flange lower flat surface of a flange section is provided further towards the case bottom surface side than a flange lower flat surface of a ring-shaped rib, a portion of the outer peripheral section of the case and the ring-shaped rib are exposed in a ring shape from an exterior molding section, and the case is provided with a plurality of projections along the inner side surface of the case which constitutes the internal space.

5 Claims, 13 Drawing Sheets

(58) Field of Classification Search
CPC .... G01R 33/09; G01R 33/093; G01R 33/095; G01R 33/096; G01R 33/098; G01R 33/0047; G01P 3/42; G01P 3/487; G01P 3/488
See application file for complete search history.

(56) References Cited

U.S. PATENT DOCUMENTS

| | | | |
|---|---|---|---|
| 6,643,909 B2* | 11/2003 | Rose | G01B 7/003 264/272.13 |
| 2005/0016297 A1* | 1/2005 | Aoki | G01D 5/147 73/862.635 |
| 2006/0260418 A1* | 11/2006 | Tsuge | G01D 11/245 73/862.331 |
| 2012/0306484 A1* | 12/2012 | Mizutani | G01D 5/145 324/244 |

FOREIGN PATENT DOCUMENTS

| | | |
|---|---|---|
| JP | 2011-234595 A | 11/2011 |
| JP | 2012-002654 A | 1/2012 |
| JP | 5014468 B2 | 8/2012 |

OTHER PUBLICATIONS

Communication dated Jun. 25, 2020, issued by the German Patent Office in German Application No. 102016222569.3.

\* cited by examiner

ROTATION SENSOR HAVING RING-SHAPED RIB

BACKGROUND OF THE INVENTION

1. Field of the Invention

The present invention relates to a rotation sensor.

2. Description of the Related Art

Japanese Patent No. 5014468 discloses a rotation sensor which seeks to achieve a simplified structure and ensure detection accuracy and reliability. Below, a rotation sensor of the type disclosed in Japanese Patent No. 5014468 is described with reference to FIGS. 17 to 22.

FIG. 17 is a schematic drawing showing an assembly structure (composition) of the rotation sensor as an illustrative example. In FIG. 17, for example, a plurality of projection-shaped sections 112 consisting of ferromagnetic bodies of iron, or the like, are disposed at intervals in the peripheral direction of the rotary shaft 111, on the outer peripheral surface of the rotary shaft 111 which is a rotary body, such as a crankshaft of an engine, etc., or a link axle which is connected to a crankshaft, for example. Below, the rotary shaft 111 and the plurality of projection-shaped sections 112 are described as a "moving magnetic body".

The rotation sensor 101 is a resin molding comprising a case 102, which is a primary molding section, and a secondary molding section (exterior resin) 9 which is formed about the periphery of the case 102. The rotation sensor 101 is introduced into an opening in the housing 110 for accommodating the rotary shaft 111, and is installed in the housing 110. In this case, the housing 110 is configured so as to make contact with the rotation sensor 101 at a flange lower flat surface of the rotation sensor, and the lower flat surface of the flange is constituted by a portion (102$f$) of the case 102 and a portion (109$a$) of the secondary molding section, and the reference numeral 102$f$ and the reference numeral 109$a$ form the same plane.

A sensor internal magnet 105, a magnetism detection unit 107 configured by an integrated circuit (IC) 104, and lead frames 103X, 103Y connected electrically to the magnetism detection unit 7 are accommodated inside the rotation sensor 101. The IC 104 includes a detection element, such as a Hall element, and a signal processing circuit (neither shown in the drawings). The IC 104 generates a signal in accordance with change in the magnetic field of the sensor internal magnet 105 which is generated in accordance with movement of the plurality of projection-shaped sections 112 due to rotation of the moving magnetic body.

In a rotation sensor 101 of this kind, the positional relationship between the moving magnetic body which is the object of rotation detection, and the IC 104 of the magnetism detection unit 107, in other words, the dimension B indicated in FIG. 17, is important. Here, as the dimension B becomes larger, in other words, as the distance between the IC 104 and the moving magnetic body becomes longer, then the change in the magnetic field becomes smaller in inverse proportion to the distance and, according to experimentation, diminishes in inverse proportion to approximately the square of the distance. Therefore, in order for the signal processing circuit of the IC 104 to carry out signal processing based on a stable signal amplitude, the IC 104 (and in particular, the detection element) must have a structure which is reliably arranged at a prescribed distance. Consequently, in the rotation sensor 101, the dimension B in FIG. 17 is important.

The dimension B is expressed by the following equation, on the basis of dimension E, dimension D and dimension A (called "gap A" below) in FIG. 17.

$$B = D - E + A$$

These dimensions are as indicated below.
A: Distance from sensor front end surface 102$e$ to projection-shaped section 112 of moving magnetic body
B: Dimension between moving magnetic body and IC 104 (surface on side of moving magnetic body: lower surface in FIG. 17)
D: Dimension between bottom surface section 102$a$ of case 102 (sensor front end surface 102$e$) and opening peripheral edge surface 102$d$ (contact surface)
E: Dimension between opening peripheral edge surface 102$d$ of case 102 and IC 104 (surface on side of moving magnetic body: lower surface of FIG. 17) (insertion depth dimension)

The gap A is determined by the following equation, using the respective dimensions indicated in FIG. 17.

$$A = \alpha + \gamma - \beta/2 - C$$

Here, the dimensions shown in FIG. 17 are as indicated below.
$\alpha$: distance from central position of assembly of moving magnetic body to assembly position of rotation sensor 101
$\beta$: diameter of moving magnetic body
$\gamma$: range of divergence between central position of rotation of moving magnetic body and assembly position of moving magnetic body in housing 110
C: pick-up length (length from flange lower flat surface 102$f$ and 109$a$, which is the sensor mounting surface of the rotation sensor 101, to the sensor front end surface 102$e$)

In this rotation sensor 101, in order to suppress fluctuation in the dimension B, the sensor is manufactured by the following steps.

First Step

FIGS. 18 and 19 are respectively a cross-sectional diagram showing the rotation sensor in FIG. 17 and an illustrative diagram for explaining one step of the manufacturing process of a rotation sensor. FIG. 19 is a cross-sectional diagram showing a state where a lead frame 103Y is viewed in the direction of arrow XIX in FIG. 18. As shown in FIGS. 18 and 19, a lead frame coupled body 103Z and the magnetism detection unit 107 are inserted into an internal space by passing through an opening 102$c$ in the case 102, which is a primary molding section, and the magnetism detection unit 107 is accommodated inside the case 102. Positioning sections 103Xe and 103Ye for positioning with respect to the case 102 are provided on the lead frame coupled body 103Z, whereby the dimension E is determined with good accuracy. Furthermore, the dimension D is determined by the structure of the single case 102.

Second Step

FIGS. 20 to 22 are respective illustrative diagrams for describing one step of a manufacturing process of the rotation sensor in FIG. 17. FIG. 21 is a cross-sectional diagram showing a state where a lead frame 103Y is viewed in the direction of arrow XXI in FIG. 20. As shown in FIGS. 20 and 21, an internal filling resin 108 is filled inside the case 102 in a state where the magnetism detection unit 107 has been accommodated inside the case 102. After curing the internal filling resin 108, a coupling section 103Za which links the lead frame coupled body 103Z to the lead frames 103X, 103Y is removed. In other words, the lead frames 103X, 103Y in the lead frame coupled body 103Z are separated from each other.

Third Step

As shown in FIG. 22, the component which is in an assembled state in the case 102 from the second step is set in an exterior die (molding die) 140X, 140Y, 140Z of a secondary molding section (exterior resin) 109. The molding dies 140X, 140Z make contact with an outer peripheral section 102g and the bottom surface section 102a of the case 102, thereby fixing the case 102. The molding die 140Y contacts terminal forming sections 103Xa, 103Ya of the lead frames 103X, 103Y, thereby fixing the lead frames 103X, 103Y. The molding die 104X is provided with a gate 140a for extruding an exterior molding resin in order to form a secondary molding section (exterior resin) 109. A connector housing for external connection and an exterior section are formed on the case 102 due to the exterior molding resin being injected from the gate 140a in the direction of the arrow 6 in FIG. 22.

The rotation sensor 101 is manufactured by implementing the first to third steps indicated above. In the rotation sensor 101 which is manufactured by the steps described above, positioning sections 103X3, 103Ye for positioning with respect to the case 102 are provided on the lead frames 103X, 103Y, and the dimension E from the contact surface of the opening peripheral edge surface 102d of the case 102 to the IC 104 which is installed on the lead frame 103Y is determined accurately. In other words, since the insertion depth dimension of the lead frames 103X, 103Y and the magnetism detection unit 107 (IC 104) into the case 102 is kept to a prescribed dimension by the positioning sections 103Xe, 103Ye, and dimensional fluctuation inside the rotation sensor 101 is suppressed, then fluctuation in the positional relationship between the moving magnetic body and the IC 104 of the magnetism detection unit 107, in other words, fluctuation in the dimension B, is suppressed.

SUMMARY OF THE INVENTION

As described above, in order to ensure the measurement accuracy of the rotation sensor 101, it is necessary to suppress fluctuation in the dimension B. However, when a secondary molding section is formed externally about the periphery of a primary molding section, the exterior molding resin may creep up on the surface of the primary molding section. If there is the creep-up portion 119 of the exterior molding resin in FIG. 22, in other words, if creep-up of the exterior molding resin occurs in the flange lower flat surface 102f in FIG. 17, then the dimension C becomes smaller and the gap A becomes larger, by the thickness of the exterior molding resin which creeps up when the rotation sensor 101 is installed on the housing 110. Consequently, the dimension B becomes larger and the measurement accuracy of the rotation sensor declines. Therefore, it is necessary to manage the creep-up portion of the exterior molding resin described above, and an inspection step becomes necessary.

Furthermore, there is a risk that the filling pressure of the exterior molding resin will cause the case 102, which is the primary molding section, to deform. In this rotation sensor 101, the fluctuation in the dimension B is suppressed due to an abutting surface of the opening peripheral edge surface 102d of the case 102 contacting the positioning sections 103Xe, 103Ye of the lead frames. However, if the case 102 deforms in the direction 11 due to the filling pressure of the exterior molding resin, as shown in FIG. 22, then the positioning section 102d distorts. Consequently, the dimension D between the bottom surface section 102a of the case 102 and the positioning section 102d changes. As a result of this, the fluctuation in the dimension B becomes greater. Therefore, the deformation of the case 102 is directly linked to increase in the fluctuation of the dimension B. Due to the foregoing, the fluctuation in the dimension B becomes greater as a consequence of deformation in the case 102, and there is a concern that the measurement accuracy of the rotation sensor 101 will decline.

This invention was devised in order to resolve the problems described above, an object thereof being to provide a rotation sensor which enables simplification of the measurement steps, such as the inspection step, as well as maintaining the measurement accuracy of the rotation sensor.

In order to achieve the object described above, the present invention is a rotation sensor detecting rotation of a rotary body including: a case; a pair of lead frames; and a magnetism detection unit, wherein the case has a bottom surface section disposed at an interval from a surface of the rotary body and a side surface section which is connected to the bottom surface section and which, together with the bottom surface section, forms a hollow internal space; an opening spatially connecting with the internal space is provided in the side surface section of the case on an opposite side to the bottom surface section; an outer peripheral section of the case has a ring-shaped rib; each of the pair of lead frames has a transmission path forming section having one end section and another end section, the transmission path forming section forming a transmission path for an electrical signal or a transmission path for electric power; the one end section of the transmission path forming section of the pair of lead frames is inserted into the internal space of the case via the opening; the pair of lead frames are disposed in such a manner that the other end section of the transmission path forming section projects to the outer side of the case; the magnetism detection unit is provided in the one end section of the transmission path forming section and is accommodated in the internal space of the case; the magnetism detection unit has magnetism detection means for detecting change in a magnetic field of a magnet provided in the rotary body or change in a magnetic field of a magnet accommodated in the internal space of the case; the pair of lead frames respectively have positioning sections which contact the side surface section of the case when the transmission path forming section is inserted into the internal space of the case, and in this state of contact, keep the insertion depth dimension of the magnetism detection unit in the internal space of the case to a prescribed dimension; the rotation sensor is further provided with an exterior molding section having a flange section about the periphery of the case; and a flange lower flat surface of the flange section is provided further towards the case bottom surface side than a flange lower flat surface of the ring-shaped rib, an outer peripheral section of the case and a portion of the ring-shaped rib are configured to be exposed in a ring shape from the exterior molding section, and a plurality of projections are provided along the inner side surface of the case which constitute the internal space.

According to the present invention, it is possible to simplify a manufacturing process, such as an inspection step, for a rotation sensor, as well as maintaining the measurement accuracy of the rotation sensor.

DESCRIPTION OF THE PREFERRED EMBODIMENTS

Figure 1:
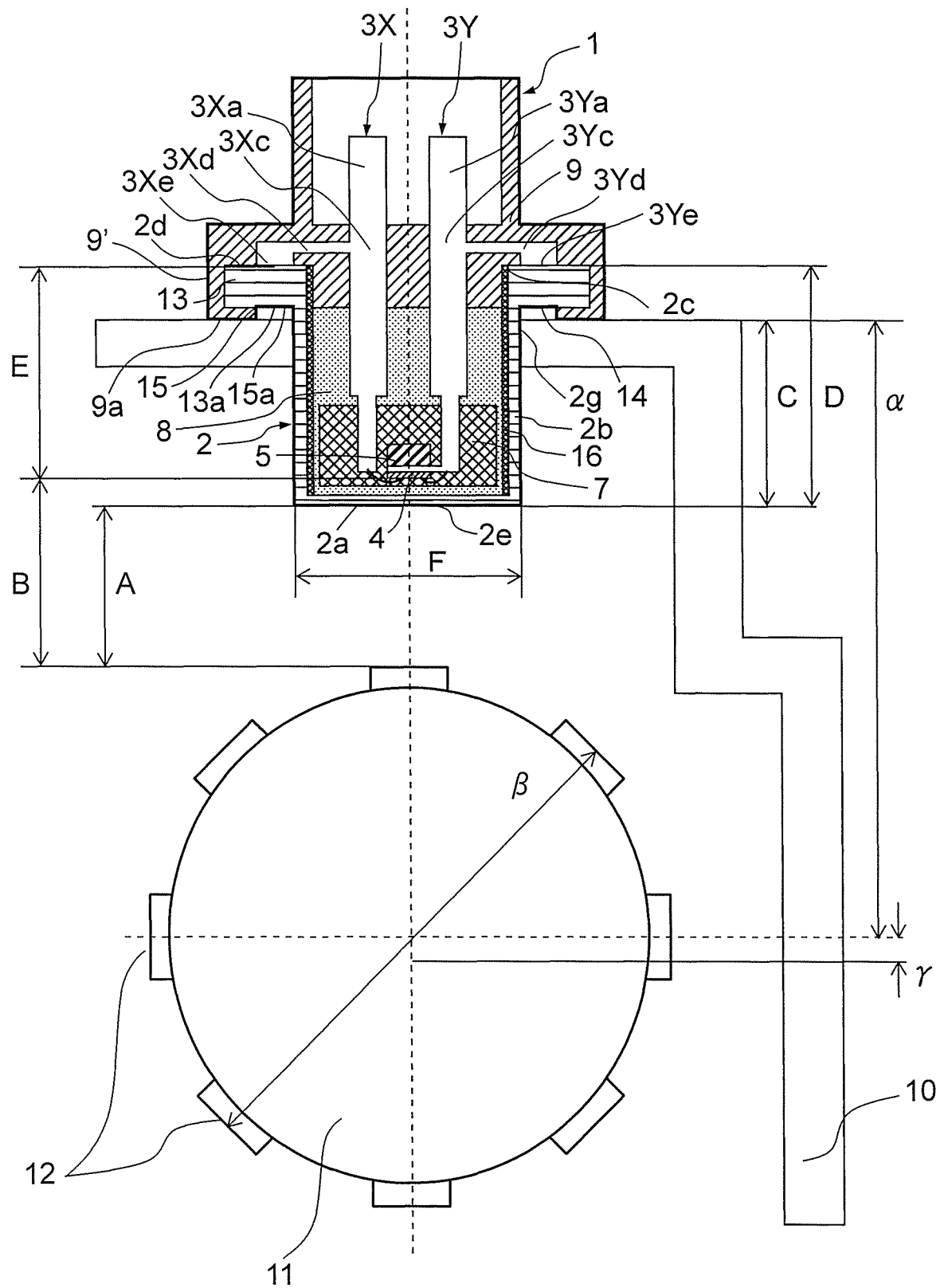
FIG. 1 is a diagram showing a constitution of an assembly structure of a rotation sensor according to a first embodiment of the invention.

Below, embodiments of the present invention are described with reference to the drawings. Same reference numerals are used for same or corresponding sections in the drawings.

First Embodiment

Figure 2:
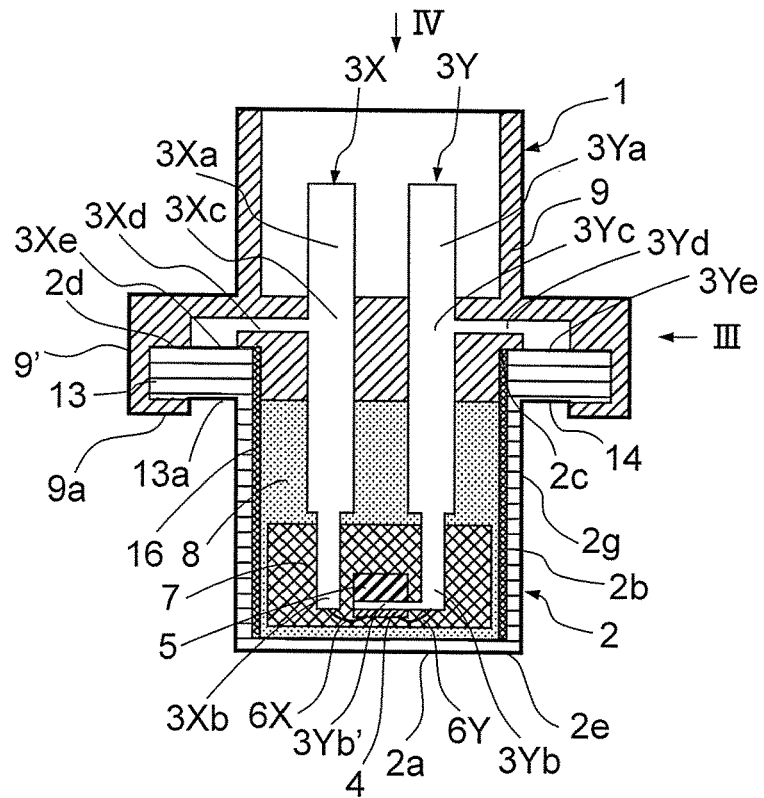
FIG. 2 is a cross-sectional diagram showing a rotation sensor according to the first embodiment of this invention.
Figure 3:
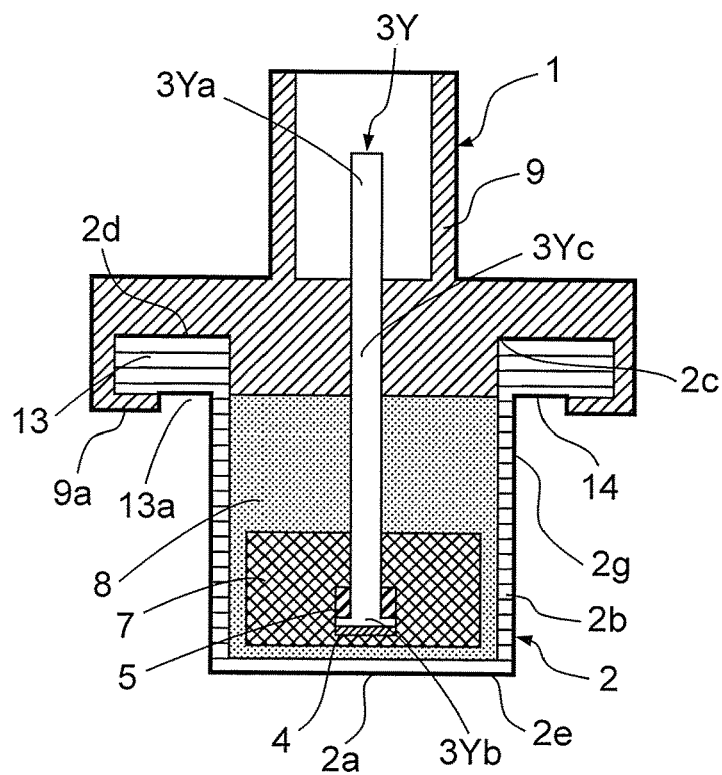
FIG. 3 is a cross-sectional diagram showing a rotation sensor according to the first embodiment of this invention.

A rotation sensor for detecting rotation of a rotating body, which is used in an engine or transmission, etc. of an automobile, for example, is described as a first embodiment. FIGS. 1 to 4 are cross-sectional diagrams showing a rotation sensor according to the first embodiment of this invention. FIG. 3 is a cross-sectional diagram showing a state where a lead frame 3Y is viewed in the direction of arrow III in FIG. 2. In FIGS. 1 to 3, the rotation sensor 1 according to the first embodiment has a case (bottomed case) 2 which is a primary molding section, a pair of lead frames 3X, 3Y, an IC 4 serving as magnetism detection means, a sensor internal magnet 5, and a pair of wires 6X, 6Y. The IC 4, the sensor internal magnet 5 and the pair of wires 6X, 6Y are unified in a single body by epoxy resin, or the like, to constitute a magnetism detection unit (rotation detection unit) 7. The IC 4, includes a detection element, which is a Hall element, for example, and a signal processing circuit (neither illustrated in the drawings).

The case 2 has a bottom surface section 2a and a side surface section 2b. The shape of the side surface section 2b is a round ring-shape in cross-section. Furthermore, the lower end of the side surface section 2b is connected to the bottom surface section 2a. Moreover, the side surface section 2b, together with the bottom surface section 2a, forms a hollow internal space inside the case 2. Furthermore, an opening 2c is provided in the case 2 and is disposed so as to border the bottom surface section 2a and connect spatially with the internal space. The opening peripheral edge surface (the upper surface in FIGS. 1 to 3) 2d, which is the end surface of the side surface section 2b of the case 2 on the opposite side to the bottom surface section 2a, constitutes an abutting surface for abutting against the lead frames 3X, 3Y.

The outer surface of the bottom surface section 2a (the lower surface in FIGS. 1 to 3) constitutes a front end surface 2e of the rotation sensor 1. The case 2 has a ring-shaped rib 13 on the case opening 2c side of the outer peripheral section 2g, which is a portion that fits with the housing 10.

Figure 4:
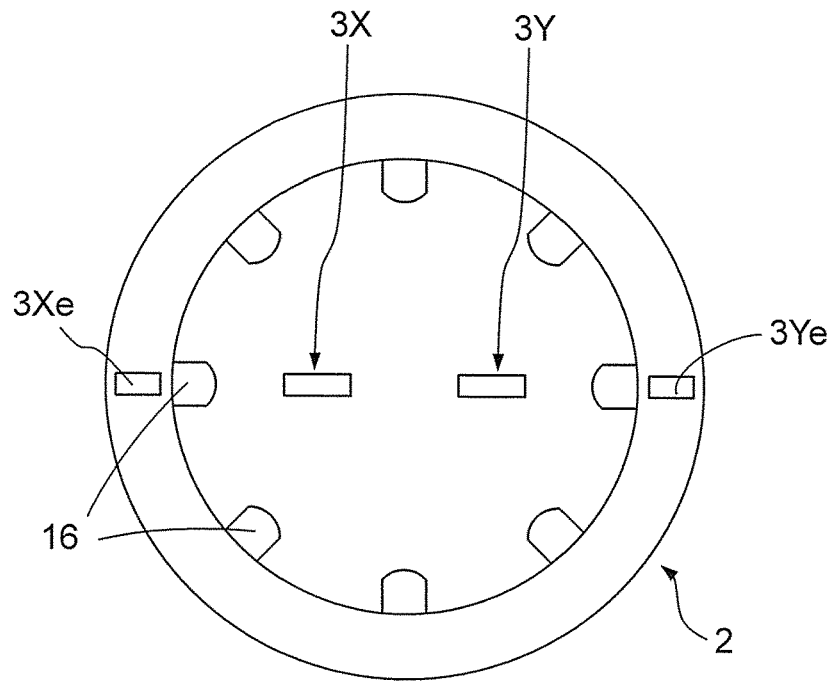
FIG. 4 is a cross-sectional diagram showing a rotation sensor according to the first embodiment of this invention.

FIG. 4 is a cross-sectional diagram showing a state where the case 2 is viewed in the direction of arrow IV in FIG. 2, but as shown in FIG. 4, the case 2 has a plurality of projections 16 along the inner side surface.

An internal filling resin 8 is filled inside the case 2. Furthermore, the opening 2c side of the case 2 is covered by a secondary molding section (exterior resin) 9 which forms an exterior molding section. The secondary molding section (exterior resin) 9 forms a connector housing for external connection, a flange lower flat surface 9a, which is a sensor mounting surface for mounting the rotation sensor 1 on the housing 10, and a sensor exterior section.

The shape of the lead frames 3X, 3Y is like the Greek letter t (lowercase "tau"). Furthermore, the lead frames 3X, 3Y are disposed at intervals in the radial direction of the side surface section 2b of the case 2. Moreover, the lead frames 3X, 3Y are inserted into the internal space of the case 2 via the opening 2c.

The lead frames 3X, 3Y have terminal molding sections 3Xa, 3Ya, IC connection sections 3Xb, 3Yb, transmission path forming sections 3Xc, 3Yc, projecting sections 3Xd, 3Yd, and positioning sections 3Xe 3Ye.

The terminal forming sections 3Xa, 3Ya constitute terminals for external connection. The IC connection sections 3Xb, 3Yb are electrically connected to the IC 4 via wires 6X, 6Y. The shape of the transmission path forming sections 3Xc, 3Yc is a bar shape or plate shape. Furthermore, the transmission path forming sections 3Xc, 3Yc form signal/electric power transmission paths between the terminal forming sections 3Xa, 3Ya and the IC connection sections 3Xb, 3Yb.

The projecting sections 3Xd, 3Yd are formed so as to project (branch off) from the central portion of the transmission path forming section 3Xc, 3Yc in the lengthwise direction, in a direction perpendicular to the lengthwise direction of the transmission path forming sections 3Xc, 3Yc (the left/right direction in FIGS. 1 and 2). Furthermore, the projecting sections 3Xd, 3Yd and the transmission path forming sections 3Xc, 3Yc intersect perpendicularly. The projecting section 3Xd and the positioning section 3Xe, and the projecting section 3Yd and the positioning section 3Ye, are respectively formed in an L shape.

The positioning sections 3Xe, 3Ye project towards the IC connection sections 3Xb, 3Yb in the lengthwise direction of the transmission path forming sections 3Xc, 3Yc (downwards in FIGS. 1 and 2) from the opposite ends of the projecting sections 3Xd, 3Yd to the transmission path forming sections 3Xc, 3Yc. The lower end surfaces of the positioning sections 3Xe, 3Ye constitute positioning surfaces and contact the opening peripheral edge surface 2d of the case.

The IC connection section 3Yb is parallel to the bottom surface section 2a of the case 2, and has an IC installation surface section 3Yb' which is a flat plate shape. The IC 4 is installed on one surface of the IC installation surface section 3Yb' (the lower surface of the IC installation surface section 3Yb' in FIGS. 1 to 3). The sensor internal magnet 5 is installed on the other surface of the IC installation surface section 3Yb' (the upper surface of the IC installation surface section 3Yb' in FIGS. 1 to 3).

The magnetism detection unit 7 has the detection element of the IC 4 as magnetism detection means, and the detection element of the IC 4 receives electric power from the transmission path forming section 3Yc via the wire 6Y, and generates a signal corresponding to the change in the magnetic field of the sensor internal magnet 5 due to the movement of the plurality of projection-shaped sections 12 (moving magnetic body). The detection element of the IC 4 outputs the generated signal to the transmission path forming section 3Xc via the wire 6X.

Here, the various dimensions of the rotation sensor 1 in FIG. 1 will be described. The dimension B which is important for maintaining the measurement accuracy of the rotation sensor is expressed by the following equation on the basis of dimension E, dimension D and gap A.

$$B=D-E+A$$

These dimensions are as indicated below.
A: Distance from sensor front end surface 2e to projection-shaped sections 12 of moving magnetic body
B: Dimension between moving magnetic body and IC 4 (surface on side of moving magnetic body: lower surface in FIG. 1)
D: Dimension between bottom surface section 2a of case 2 (sensor front end surface 2e) and opening peripheral edge surface 2d (contact surface)
E: Dimension between opening peripheral edge surface 2d of case 2 and IC 4 (surface on side of moving magnetic body: lower surface of FIG. 1) (insertion depth dimension)

The gap A is determined by the following equation, using the respective dimensions indicated in FIG. 1.

$$A=\alpha+\gamma-\beta/2-C$$

Here, the dimensions shown in FIG. 1 are as indicated below.
α: distance from central position of assembly of moving magnetic body to assembly position of rotation sensor 1
β: diameter of moving magnetic body
γ: range of divergence between central position of rotation of moving magnetic body and assembly position of moving magnetic body in housing 10
C: pick-up length (length from flange lower flat surface 9a, which is the sensor mounting surface of the rotation sensor 1, to the sensor front end surface 2e)

In the present embodiment, the flange section 9' is configured only by the secondary molding section (exterior resin) 9. By providing the flange lower flat surface 9a, which is a sensor mounting surface for mounting the rotation sensor 1 on the housing 10, on the case 2 further towards the side of the sensor front end surface 2e than the ring-shaped rib lower flat surface 13a, and by providing an exposed section 14 in which the outer peripheral section 2g of the case 2 and a portion of the ring-shaped rib 13 are exposed in a ring shape, the flange lower flat surface 9a which is configured by a secondary molding section (exterior resin) 9 is separated from the interface 15 between the primary molding section and the secondary molding section. Consequently, it is possible to prevent creep-up of the exterior molding resin onto the flange section, fluctuation in the dimension C (pick-up length) of the flange lower flat surface 9a and the sensor front end surface 2e is suppressed, and the dimension C can be kept to the prescribed dimension.

Below, a manufacturing process for configuring the rotation sensor 1 according to the first embodiment will be described. FIGS. 5 to 9 are illustrative diagrams for describing one step of a manufacturing process of the rotation sensor 1 in FIG. 1.

First Step

Figure 5:
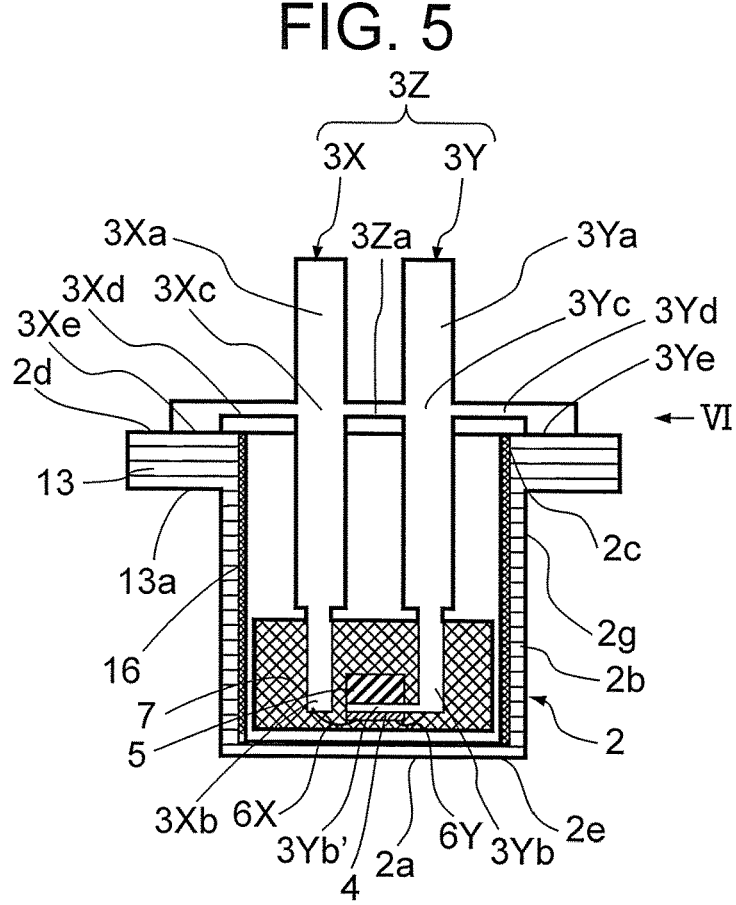
FIG. 5 is an illustrative diagram for describing one step of a manufacturing process of the rotation sensor in FIG. 1.
Figure 6:
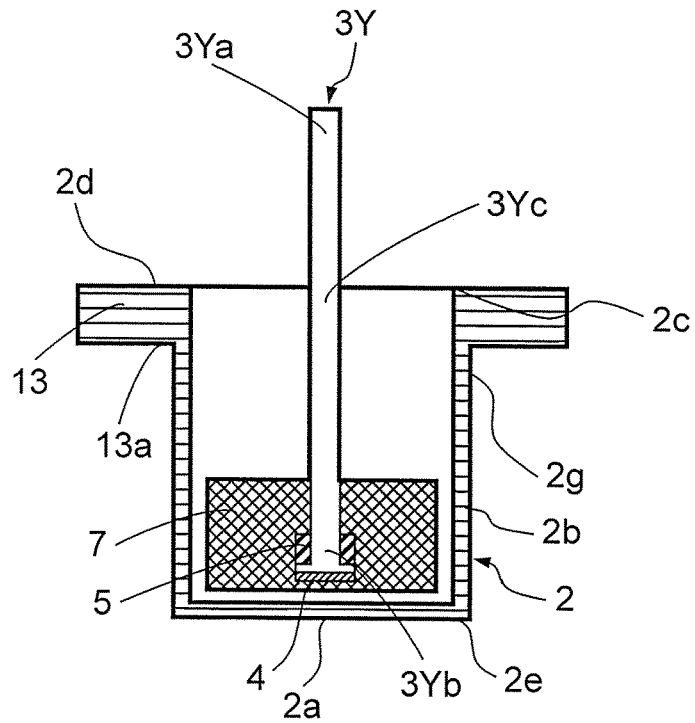
FIG. 6 is an illustrative diagram for describing one step of a manufacturing process of the rotation sensor in FIG. 1.

FIGS. 5 and 6 are illustrative diagrams for describing one step of a manufacturing process of the rotation sensor according to a first embodiment of the invention. FIG. 6 is a cross-sectional diagram showing a state where a lead frame 3Y is viewed in the direction of arrow VI in FIG. 5. As shown in FIGS. 5 and 6, a lead frame coupled body 3Z and the magnetism detection unit 7 are inserted into an internal space by passing through an opening 2c in the case 2, which is a primary molding section, and the magnetism detection unit 7 is accommodated inside the case 2. Positioning sections 3Xe, 3Ye for positioning with respect to the case 2 are provided in the lead frame coupled body 3Z, and the dimension E in FIG. 1 is determined with good accuracy. In other words, the insertion depth dimension of the lead frames 3X, 3Y and the magnetism detection unit 7 (IC 4) into the case 2 is kept to a prescribed dimension, by the positioning sections 3Xe, 3Ye, and in this state, the lead frames 3X, 3Y and the magnetism detection unit 7 are fixed by the internal filling resin 8. Accordingly, the height position of the magnetism detection unit 7 inside the case 2 is determined. Therefore, the dimension E in FIG. 1 is a prescribed dimension. Furthermore, the dimension D in FIG. 1 is determined by the structure of the single case 2.

Second Step

Figure 7:
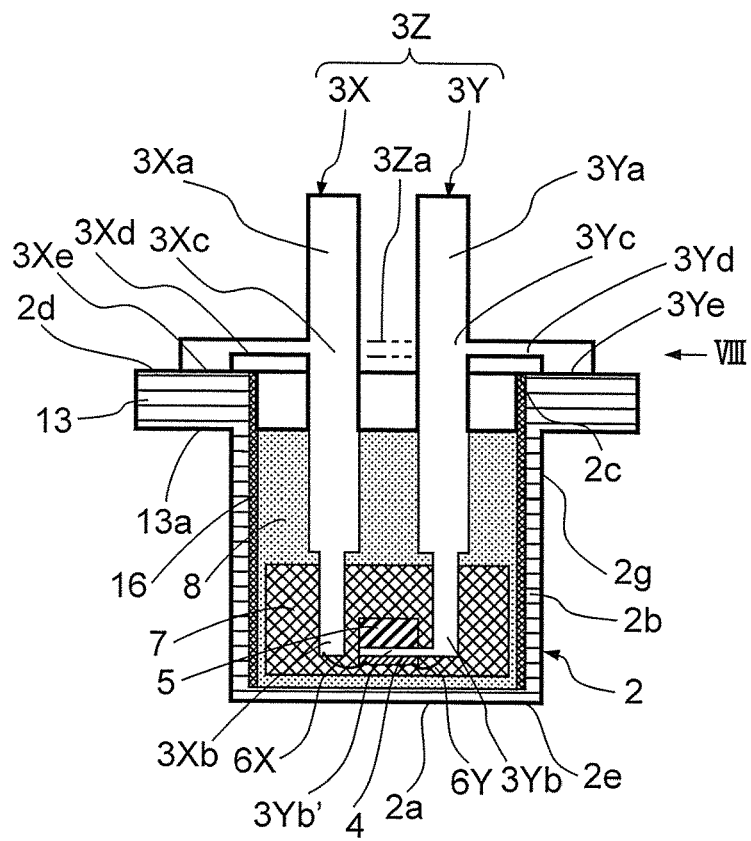
FIG. 7 is an illustrative diagram for describing one step of a manufacturing process of the rotation sensor in FIG. 1.
Figure 8:
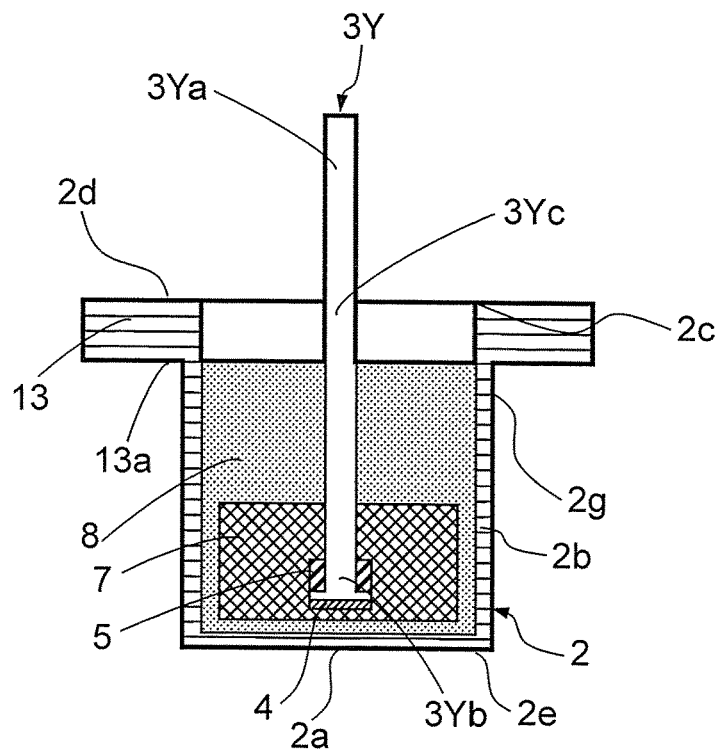
FIG. 8 is an illustrative diagram for describing one step of a manufacturing process of the rotation sensor in FIG. 1.

FIGS. 7 and 8 are illustrative diagrams for describing one step of a manufacturing process of the rotation sensor according to the first embodiment of the invention. FIG. 8 is a cross-sectional diagram showing a state where a lead frame 3Y is viewed in the direction of arrow VIII in FIG. 7. As shown in FIGS. 7 and 8, the internal filling resin 8 is filled inside the case 2 in a state where the magnetism detection unit 7 has been accommodated inside the case 2. After curing the internal filling resin 8, a coupling section 3Za, which links the lead frames 3X, 3Y, is removed from the lead frame coupled body 3Z. In other words, the lead frames 3X, 3Y in the lead frame coupled body 3Z are separated from each other.

Third Step

Figure 9:
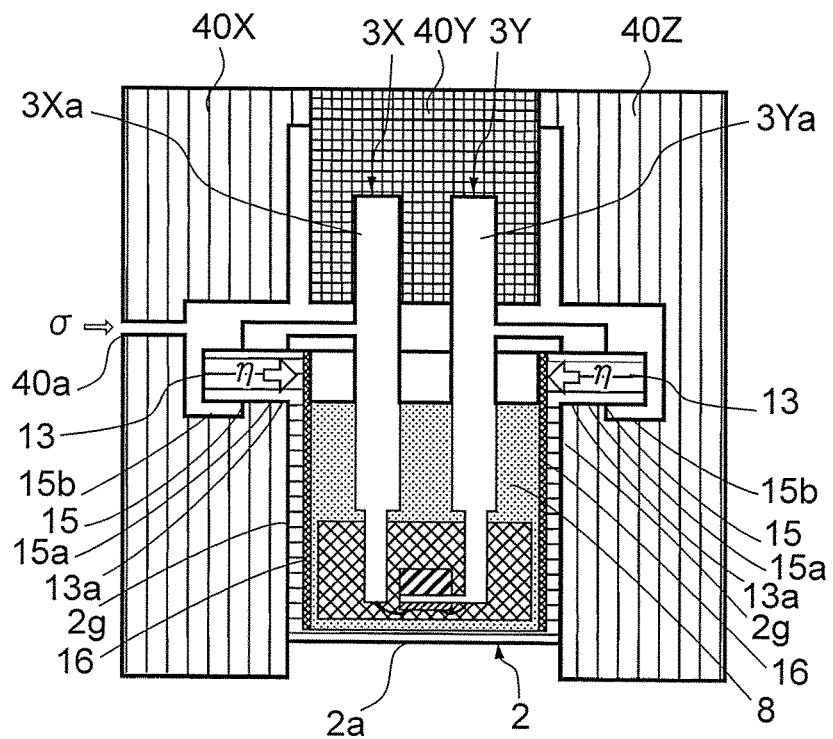
FIG. 9 is an illustrative diagram for describing one step of a manufacturing process of the rotation sensor in FIG. 1.

FIG. 9 is an illustrative diagram for describing one step of a manufacturing process of the rotation sensor according to the first embodiment of the invention. As shown in FIG. 9, the components which are in an assembled state in the case 2 from the second step are set in molding dies 40X, 40Y, 40Z of the secondary molding section (exterior resin) 9. The molding dies 40X, 40Z make contact with the outer peripheral section 2g and the ring-shaped rib 13 of the case 2, thereby fixing the case 2. The molding die 40Y contacts the terminal forming sections 3Xa, 3Ya of the lead frames 3X, 3Y, thereby fixing the lead frames 3X, 3Y. In order to configure the flange lower flat surface 9a by the secondary molding section (exterior resin) 9 only, the molding dies 40X, 40Z are divided into a region 15a which contacts the ring-shaped rib lower flat surface 13a of the case 2 (the contact section between the primary molding section and the molding die (called the "seal surface" below)), and a region 15b constituting the flange lower flat surface 9a configured by the secondary molding section (exterior resin) 9. By injecting exterior molding resin in the direction of arrow 6 in FIG. 9, from the gate 40a and into these molding dies 40X, 40Y, 40Z, a connector housing for external connection and a flange and sensor exterior section, which are a section for mounting on the housing 10, are formed in the case 2. According to the first embodiment, since the flange lower flat surface 9a is configured only by the secondary molding section (exterior resin) 9, then the pick-up length (dimension C) is determined accurately.

The rotation sensor 1 is manufactured by implementing the first to third steps indicated above.

As described above, by configuring the flange section only from a secondary molding section (exterior resin) 9, it is possible to prevent creep-up of the exterior molding resin onto the flange section, fluctuation in the dimension C (pick-up length) of the flange lower flat surface 9a and the sensor front end surface 2e is suppressed, and the dimension C can be kept to the prescribed dimension. Furthermore, in the first embodiment, a structure is adopted in which, when molding the exterior, the bottom surface section 2a of the case 2 does not contact the molding dies 40X, 40Z. By this means, when forming the exterior molding, since the only region where the case 2 and the molding dies 40X, 40Z are in contact is the seal surface 15a, then the filling pressure of the exterior molding resin is concentrated at the seal surface 15a, and a configuration that makes creep-up of exterior molding resin onto the ring-shaped rib lower flat surface 13a less liable to occur is achieved. Furthermore, even if creep-up of the second molding section (exterior molding resin) 9 onto the ring-shaped rib lower flat surface 13a occurs, the flange lower flat surface 9a and the ring-shaped rib lower flat surface 13a are not situated in the same plane, and therefore the pick-up length (dimension C) does not become larger.

Moreover, in the rotation sensor 1 according to the first embodiment, there is a plurality of projections 16 along the inner side surface of the case 2, as shown in FIG. 4. The rigidity of the case is increased in accordance with the projections 16, and the deformation in the 11 direction due to the filling pressure of the exterior molding resin is suppressed. Consequently, fluctuation in the dimension B is suppressed by suppressing distortion of the positioning section 2d of the lead frame.

Consequently, it is possible to suppress fluctuation in the dimension B, and a measurement accuracy equivalent to or higher than the conventional rotation sensor can be maintained. In addition, since creep-up of the exterior molding resin onto the flange section can be suppressed, then an inspection step can be omitted.

Furthermore, as an additional effect, by providing the exposed section 14 so as to contact the case outer peripheral section 2g, it is possible to prevent creep-up of the exterior molding resin onto the case outer peripheral section 2g. Therefore, fluctuation in the diameter dimension F of the outer peripheral section 2g of the case 2 in FIG. 1 is suppressed and can be kept to a prescribed dimension. When the fluctuation in the diameter dimension F has become larger, the fitting properties with the housing 10 become worse. If creep-up of the exterior molding resin occurs in the case outer peripheral section 2g, then an inspection step is necessary, but in the rotation sensor according to the first embodiment, the inspection step can be omitted.

Moreover, in the case of the rotation sensor 1 according to the first embodiment, since the flange lower flat surface 9a is provided on the secondary molding section (exterior resin) 9, then it is possible to change the pick-up length just by changing the die for exterior molding, without changing the shape of the case. For instance, in a vehicle-mounted rotation sensor, the distance between the housing and the moving magnetic body varies with the layout of the engine, and therefore a rotation sensor having a pick-up length corresponding to the layout is necessary. According to the present embodiment, it is possible to achieve rotation sensors having various pick-up lengths using the same case, and since common parts can be used for the case, then the manufacturing steps can be simplified and costs can be lowered.

As described above, according to the rotation sensor of the present invention, it is possible to prevent creep-up of exterior resin onto the flange lower flat surface and the case outer peripheral section during exterior molding, and the dimensions of the flange lower flat surface and the sensor front end surface (pick-up length) and/or the dimensions of the outer periphery of the case can be kept to prescribed dimensions. Furthermore, by suppressing deformation of the case during exterior molding, it is possible to maintain the positioning accuracy of the IC inside the sensor, and therefore a measurement accuracy equivalent to or greater than an existing rotation sensor can be maintained. In addition, it is possible to omit an inspection step for managing creep-up of the exterior molding resin onto the flange lower flat surface and the case outer peripheral section.

Second Embodiment

Figure 10:
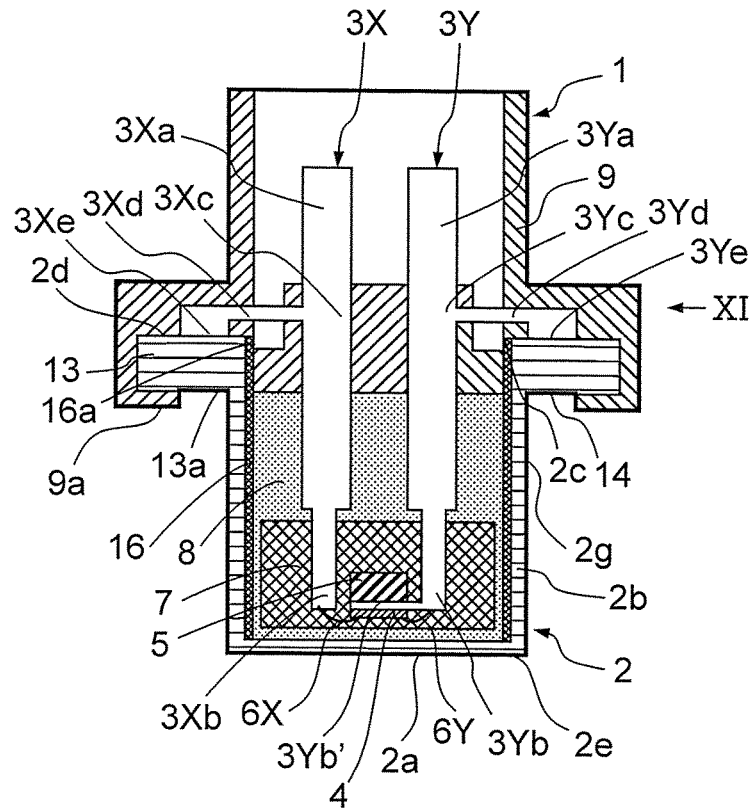
FIG. 10 is a cross-sectional diagram showing a rotation sensor according to a second embodiment of this invention.
Figure 11:
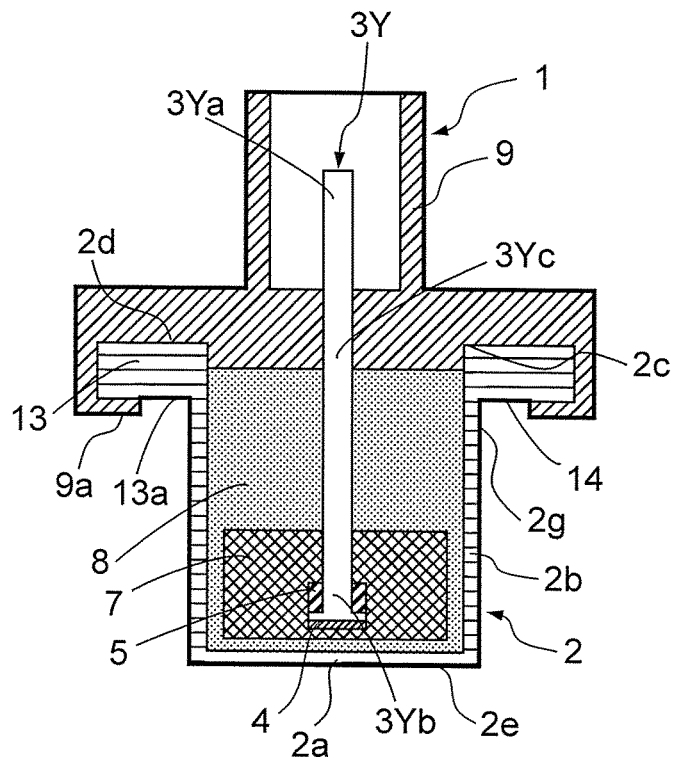
FIG. 11 is a cross-sectional diagram showing a rotation sensor according to a second embodiment of this invention.
Figure 12:
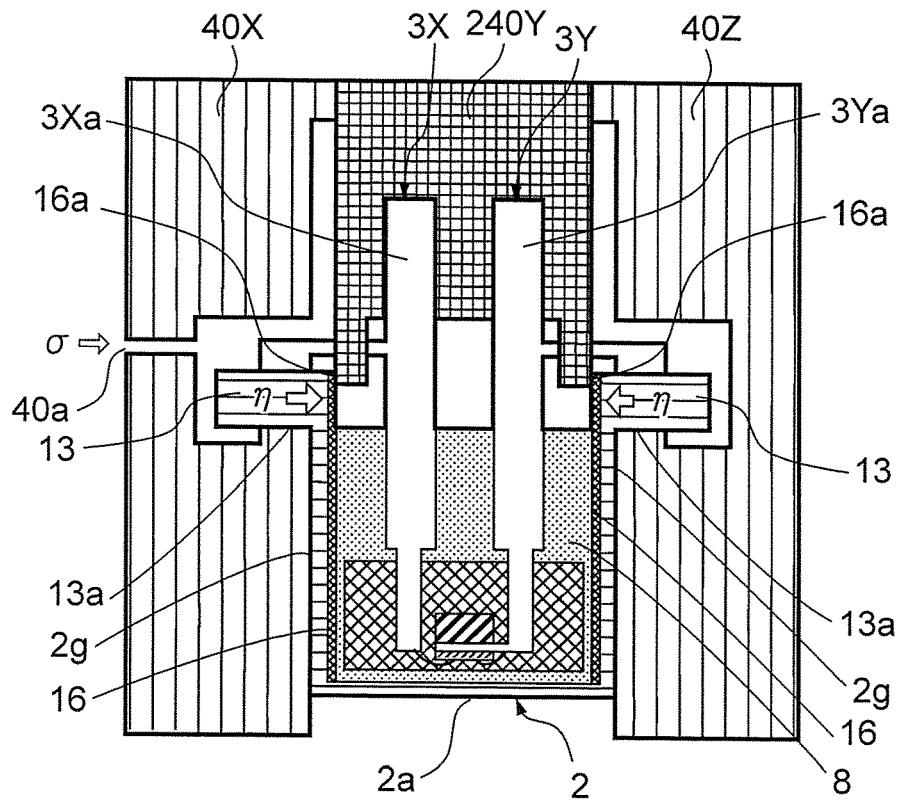
FIG. 12 is an illustrative diagram for describing one step of a manufacturing process of the rotation sensor in FIGS. 10 and 11.

A second embodiment of the present invention is described here with reference to FIGS. 10 to 12. The second embodiment is similar to the first embodiment described above, with the exception of the content described below. FIGS. 10 and 11 are cross-sectional diagrams showing a rotation sensor according to the second embodiment of this invention. FIG. 11 is a cross-sectional diagram showing a state where a lead frame 3Y is viewed in the direction of arrow XI in FIG. 10. FIG. 12 is an illustrative diagram for describing one step of a manufacturing process of the rotation sensor according to the second embodiment of the invention. Below, a step of a molding process (corresponding to the third step of the first embodiment) for the secondary molding section (exterior resin) 9 which forms the connector housing and sensor exterior section according to the second embodiment will be described.

As shown in FIG. 12, a portion of the molding die 240Y of the connector housing section is inserted into an internal space of the case 2, and exterior molding resin is injected in the direction of arrow 6 from the gate 40a. With respect to the first embodiment, the second embodiment causes all or a part of the plurality of projections 16 provided along the inner side surface of the case 2 to contact the molding die 240Y. Consequently, the contact portion between the projections 16 and the molding die 240Y (called "die contact section" below) 16a forms a portion of the inner periphery of the connector housing.

By means of the die contact section 16a, it is possible to suppress deformation of the case 2 in the η direction due to the filling pressure of the exterior molding resin. Consequently, distortion of the positioning section of the lead frame due to deformation of the case 2 can be suppressed, and decline in the measurement accuracy of the rotation sensor can be prevented. Moreover, the fluctuation in the diameter dimension F of the case outer peripheral section 2g can be kept to a prescribed dimension.

Third Embodiment

Figure 13:
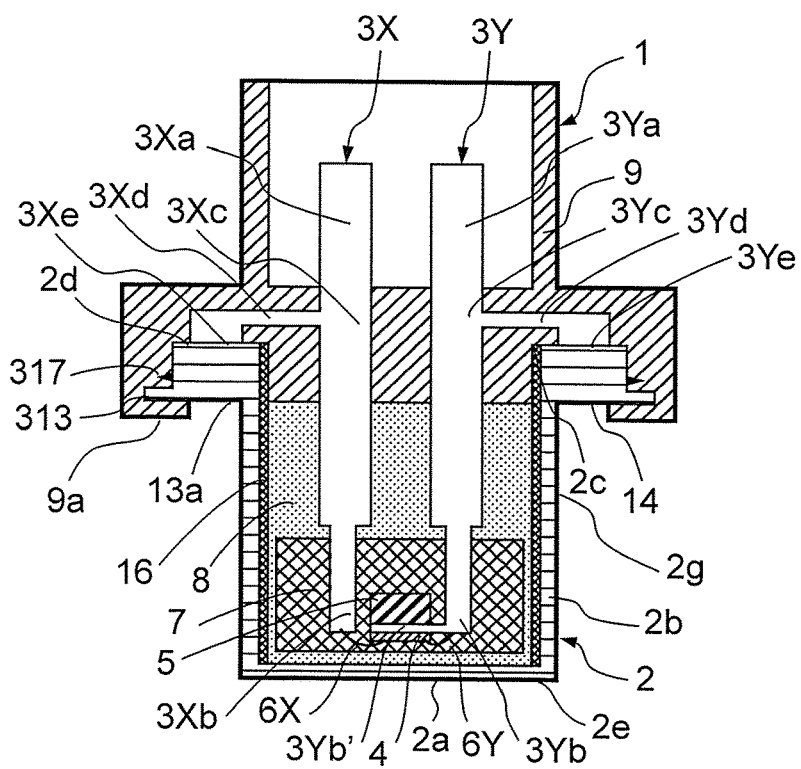
FIG. 13 is a cross-sectional diagram showing a rotation sensor according to a third embodiment of this invention.

FIG. 13 is a cross-sectional diagram showing a rotation sensor according to the third embodiment of this invention. The third embodiment is similar to the first embodiment described above, with the exception of the content described below. In a vehicle-mounted rotation sensor constituted by a first molding section and a second molding section, thin ribs (called "melt ribs" below) are disposed in order to raise the contact properties at the interface therebetween.

However, since the melt ribs must be extremely thin in order to reduce the heat capacity, and must be free of defects about the whole circumference thereof, it is necessary to be careful about damage to the melt ribs during manufacture. In the present embodiment, the melt ribs are protected by providing a diameter differential in the ring-shaped ribs 313. In the third embodiment, in relation to the first or second embodiment, the ring-shaped rib 313 of the case 2 has a relatively large-diameter section and a relatively small-diameter section, and ring-shaped projections 317 (melt ribs) having a smaller diameter than the ring-shaped rib 313 are provided concentrically with the ring-shaped rib 313, in the small-diameter section which contacts the secondary molding section (exterior resin) 9. Therefore, with the melt ribs 317 being protected by means of the ring-shaped rib 313, and damage due to handling, etc. in the manufacturing process can be prevented. Consequently, it is possible to omit an inspection step for external verification of the melt ribs 317.

Fourth Embodiment

Figure 14:
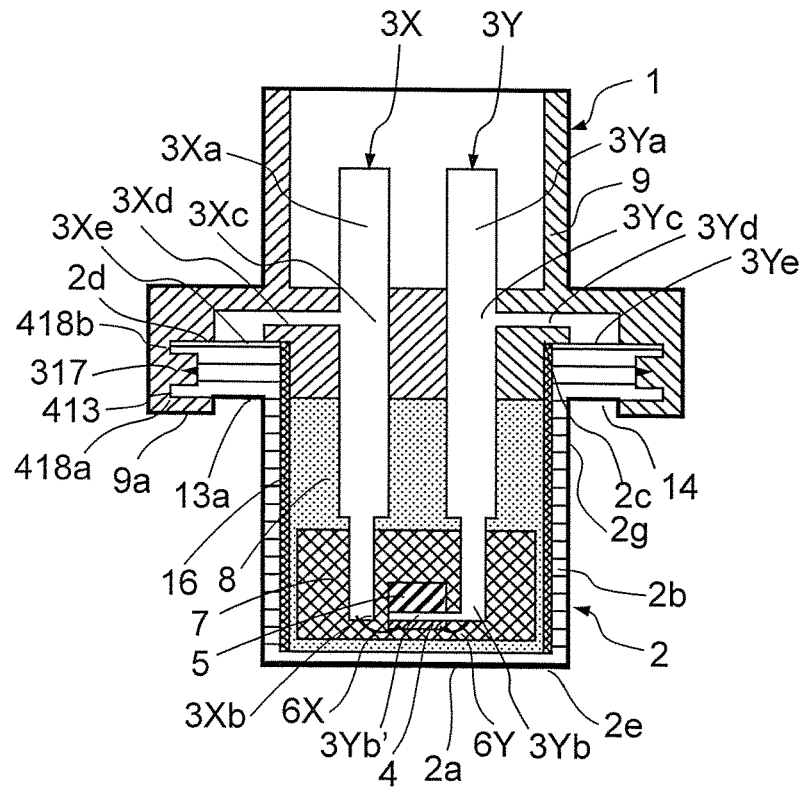
FIG. 14 is a cross-sectional diagram showing a rotation sensor according to a fourth embodiment of this invention.

FIG. 14 is a cross-sectional diagram showing a rotation sensor according to a fourth embodiment of this invention. The fourth embodiment is similar to the first embodiment described above, with the exception of the content described below. In the third embodiment, the melt ribs 317 are provided in the vicinity of the ring-shaped rib 413 of the case 2 and in a region which contacts the secondary molding section (exterior resin) 9, the melt ribs 317 being thinner than the other portions, being concentric with the ring-shaped rib 413, and having a smaller diameter than the ring-shaped rib 413, whereas in the fourth embodiment, large-diameter sections 418b having a larger diameter than the melt ribs 317 are also provided additionally so as to surround the melt ribs 317, between two ring-shaped ribs. In other words, the ring-shaped rib 413 of the case 2 has a pair of relatively large-diameter sections 418a, 418b and a relatively small-diameter section, the small-diameter section being positioned between the pair of large-diameter sections, and ring-shaped projections 317 (melt ribs) which are concentric with the ring-shaped rib 413 and have a smaller diameter than the ring-shaped rib 413 are provided in the small-diameter section that contacts the secondary molding section (exterior resin) 9. Consequently, since the melt ribs 317 are protected from above and below by the two portions of the ring-shaped rib, then it is possible to prevent damage caused by handling during the manufacturing process (such as jig contact or dropping). Consequently, it is possible to omit an inspection step for external verification of the melt ribs 317.

Fifth Embodiment

Figure 15:
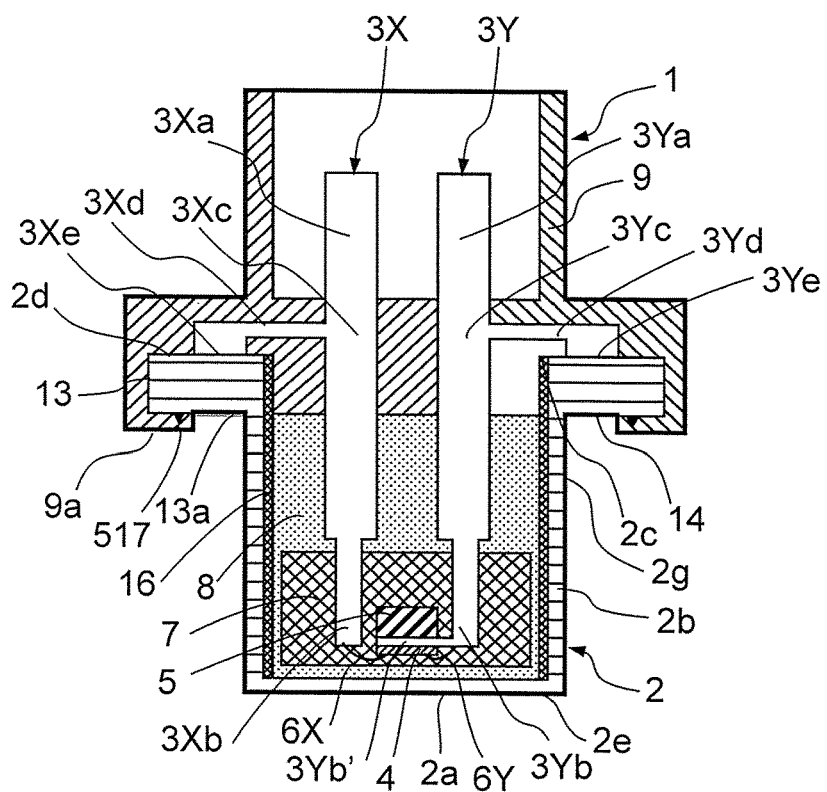
FIG. 15 is a cross-sectional diagram showing a rotation sensor according to a fifth embodiment of this invention.

FIG. 15 is a cross-sectional diagram showing a rotation sensor according to a fifth embodiment of this invention. The fifth embodiment is similar to the first embodiment described above, with the exception of the content described below. In relation to the third embodiment, the fifth embodiment has a ring-shaped projection (melt ribs) 517 provided concentrically with the case outer peripheral section 2g and perpendicularly with respect to the ring-shaped rib lower flat surface 13a situated in the region that contacts the secondary molding section (exterior resin) 9. Therefore, since the ring-shaped projections 517 are protected by the ring-shaped rib 13 and the case bottom surface section 2a, then it is possible to prevent damage caused by handling during the manufacturing process (such jig contact or dropping). Consequently, it is possible to omit an inspection step for external verification of the ring-shaped projections 517. The fifth embodiment may also be applied suitably, since similar beneficial effects are obtained with respect to the first to fourth embodiments.

Sixth Embodiment

Figure 16:
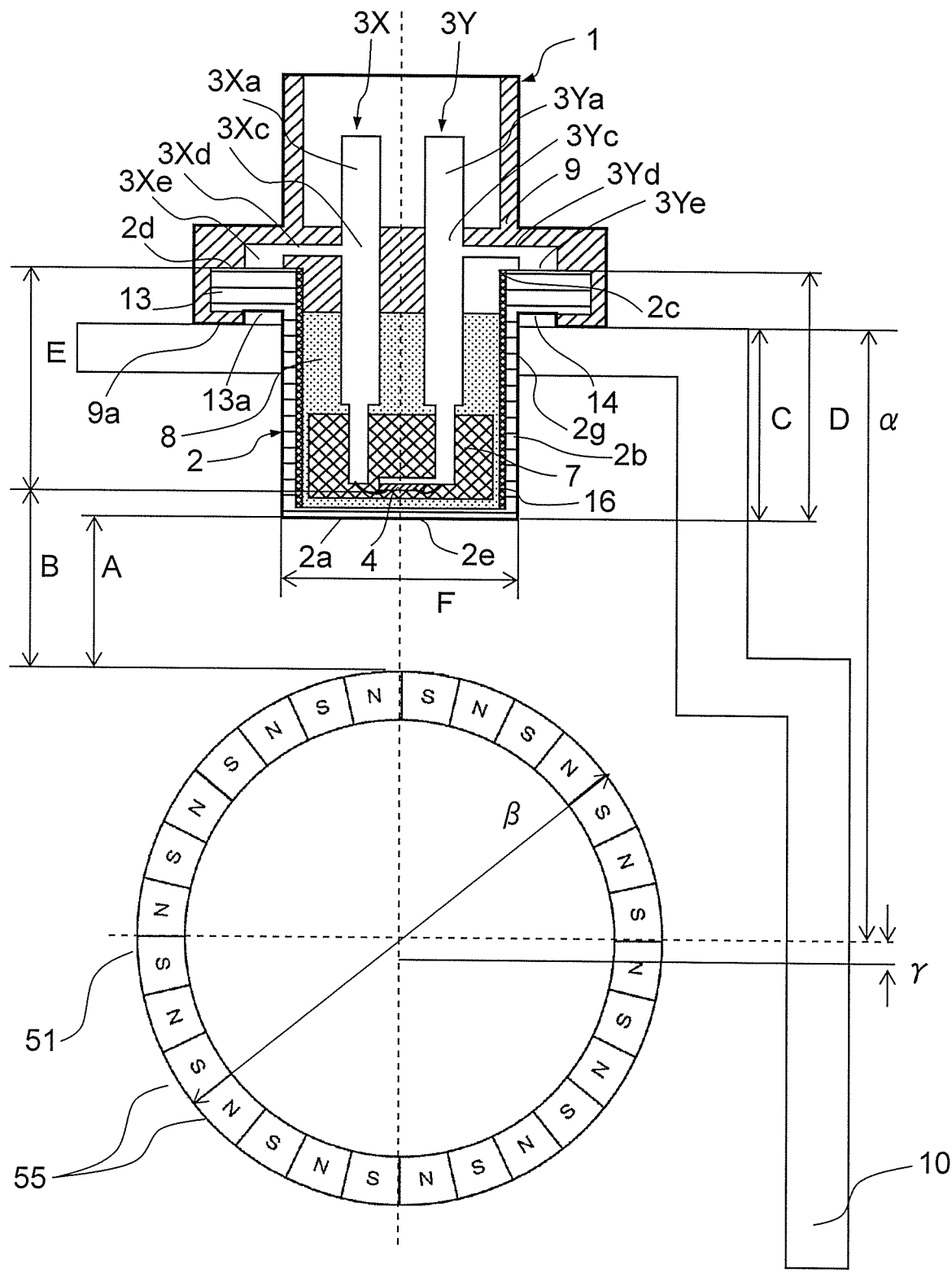
FIG. 16 is a cross-sectional diagram showing a rotation sensor according to a sixth embodiment of this invention.
Figure 17:
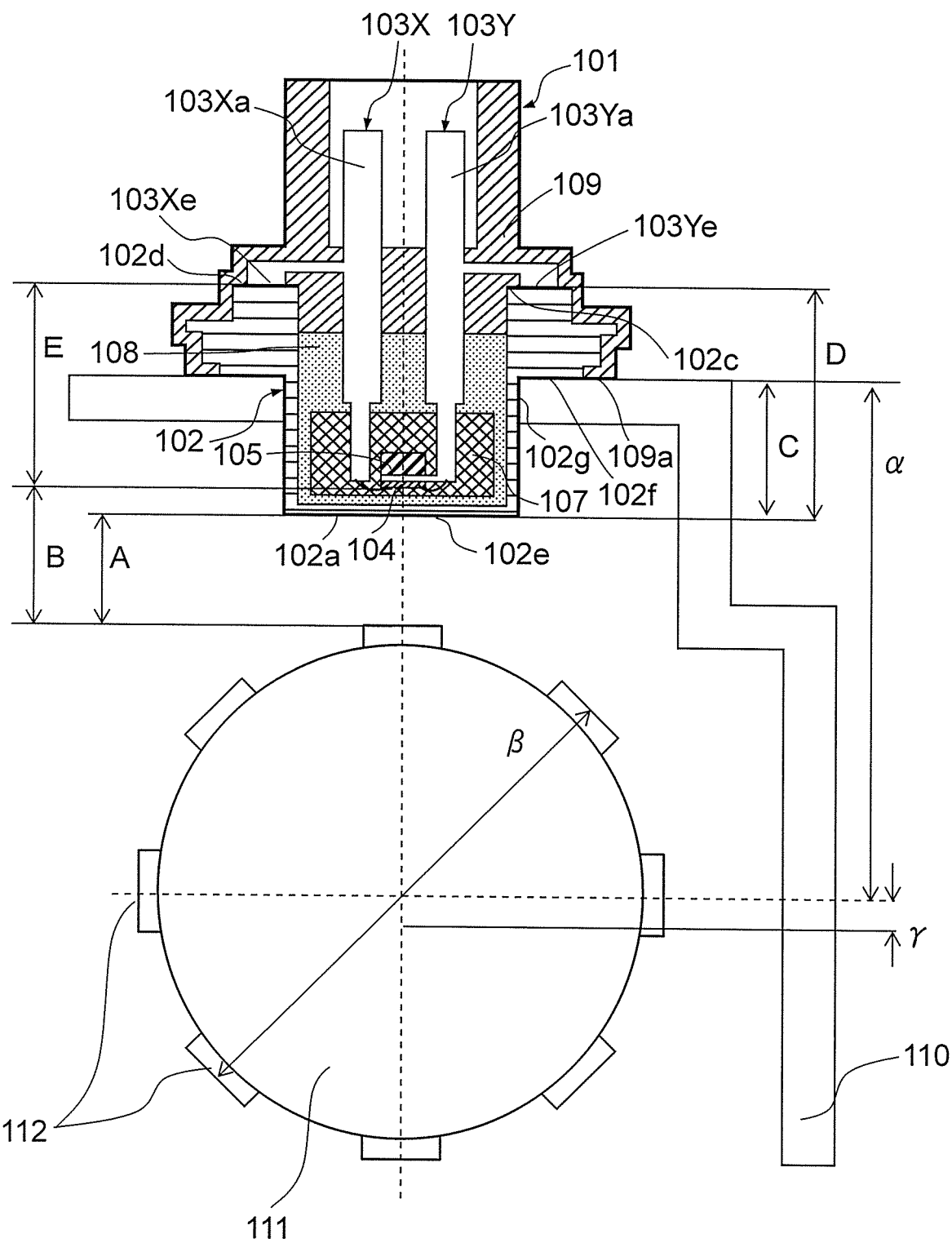
FIG. 17 is a diagram showing a constitution of an assembly structure of a rotation sensor in an illustrative example.
Figure 18:
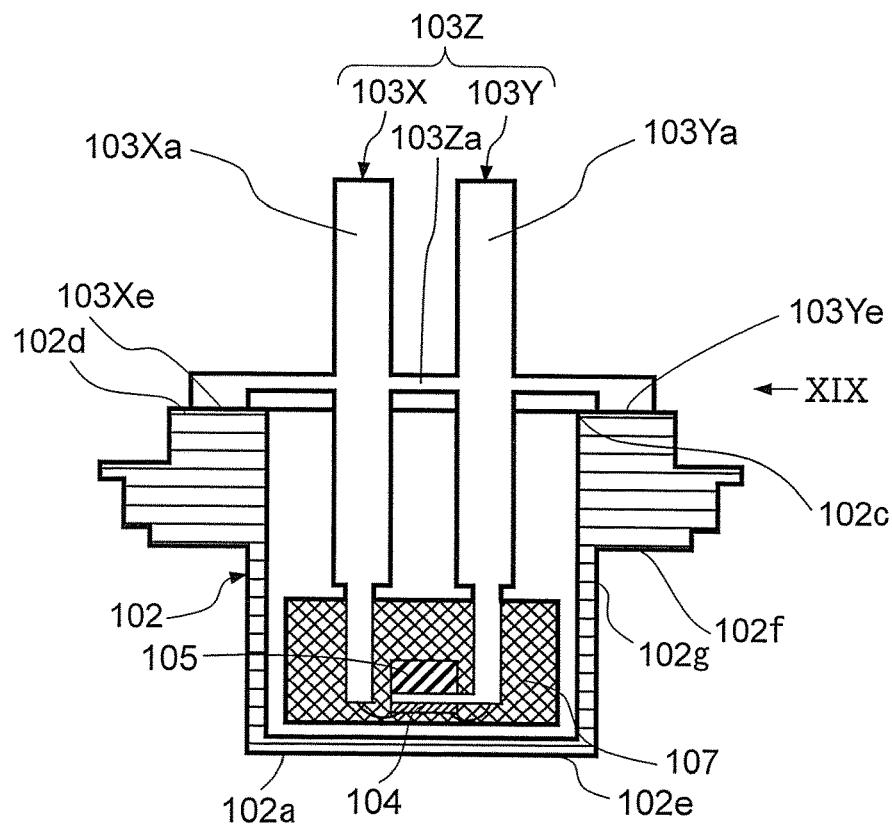
FIG. 18 is a cross-sectional diagram showing a rotation sensor in an illustrative example.
Figure 19:
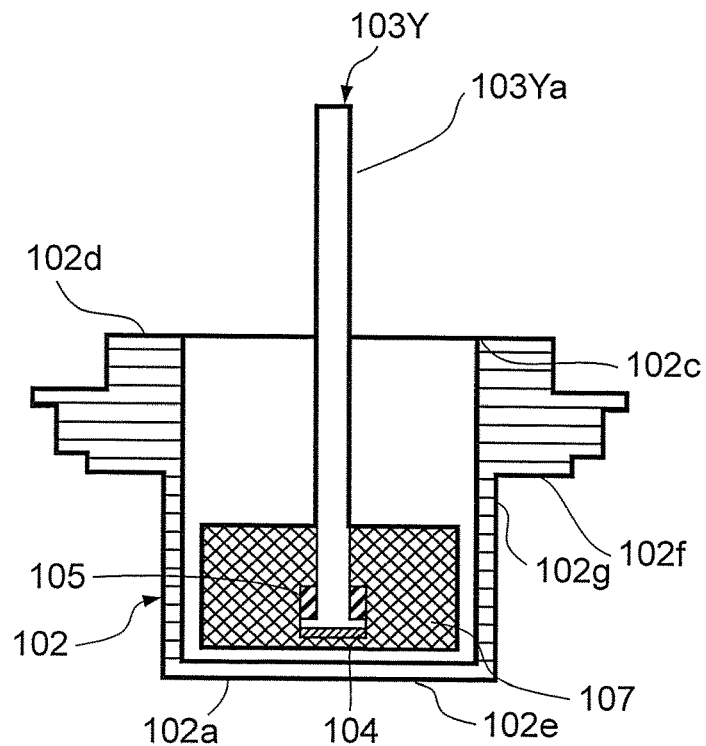
FIG. 19 is a cross-sectional diagram showing a rotation sensor in an illustrative example.
Figure 20:
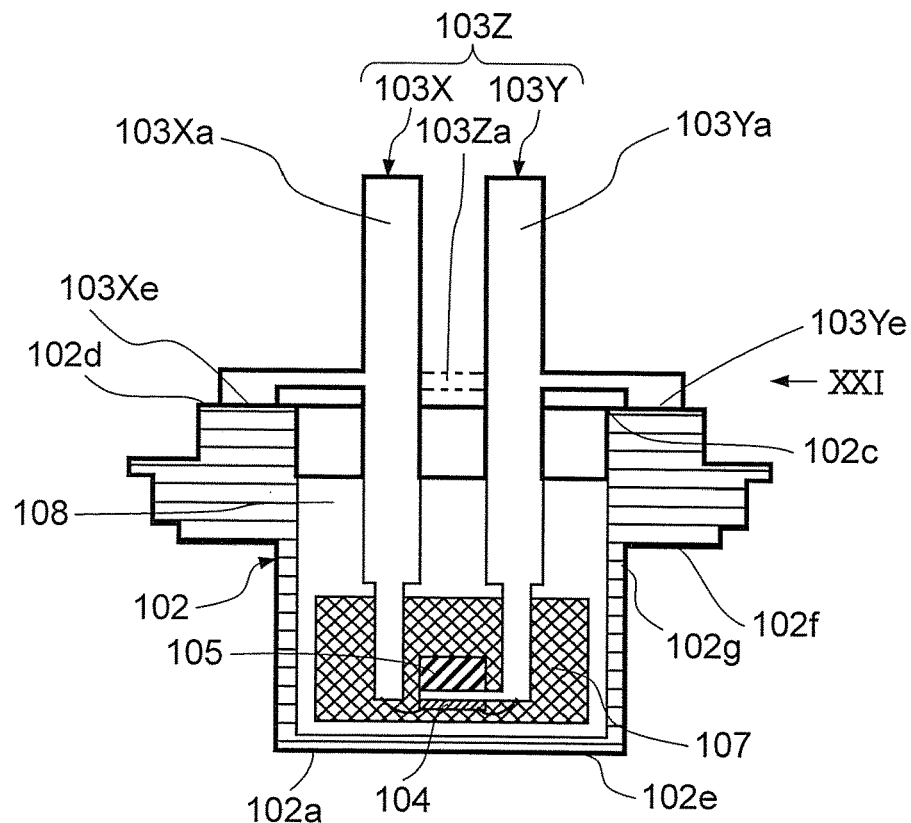
FIG. 20 is an illustrative diagram for describing one step of a manufacturing process of the rotation sensor in an illustrative example.
Figure 21:
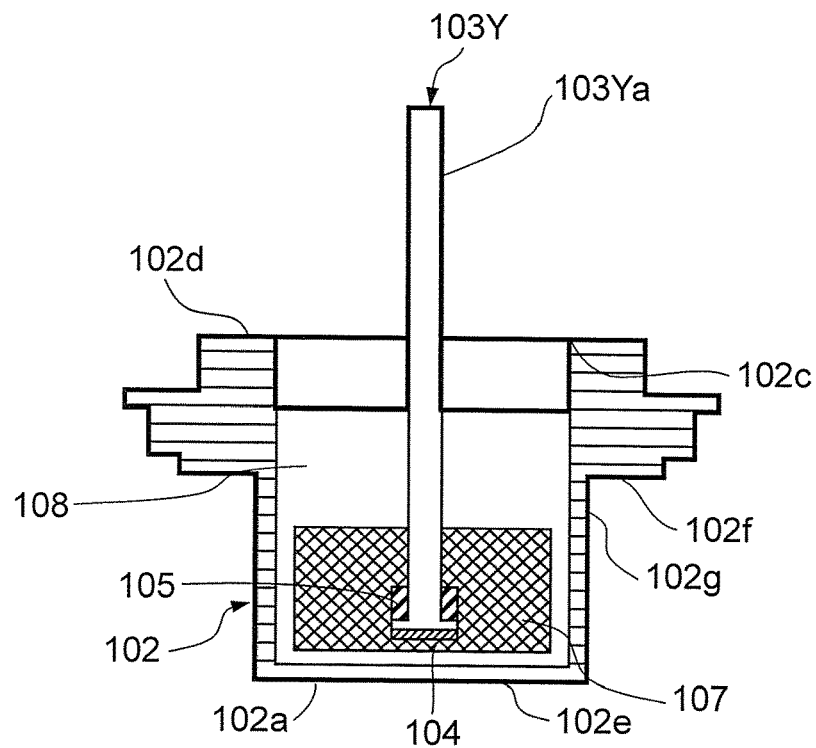
FIG. 21 is an illustrative diagram for describing one step of a manufacturing process of the rotation sensor in an illustrative example.
Figure 22:
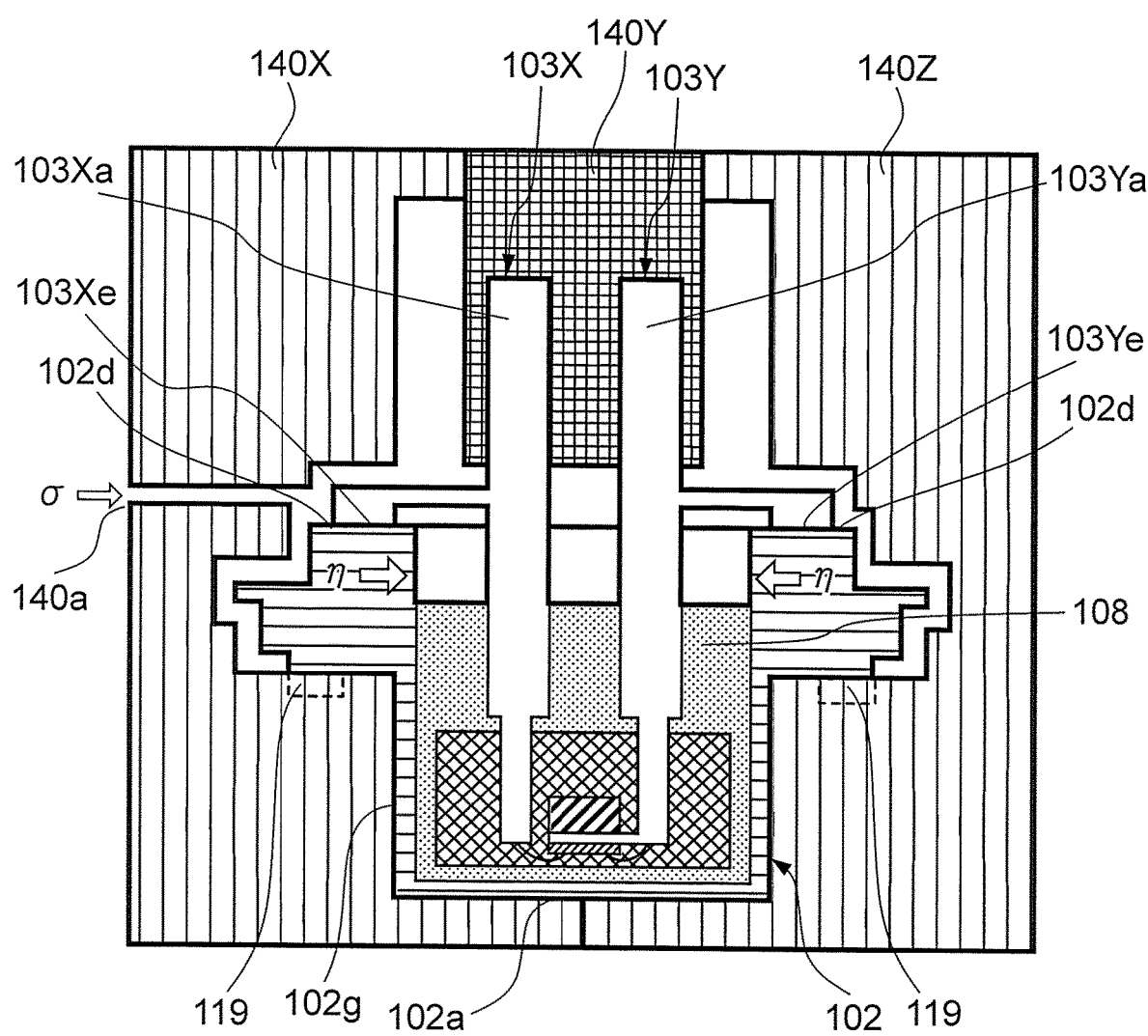
FIG. 22 is an illustrative diagram for describing one step of a manufacturing process of the rotation sensor in an illustrative example.

In the first to fifth embodiments, a configuration is described in which a detection element of an IC 4 detects change in the magnetic field of a sensor internal magnet 5 which is accommodated in an internal space of a case 2. In this respect, in the sixth embodiment, as shown in FIG. 16, the sensor internal magnet 5 of the first to fifth embodiments is omitted, and the detection element of the IC 4 detects change in the magnetic field of a plurality of sensor external magnets 55 provided on the outer peripheral surface of the rotary shaft 51. Here, in the first to fifth embodiments, the shape of the moving magnetic body is an uneven surface shape or a gear shape, but in the sixth embodiment, the shape of the moving magnetic body is a circular shape in a vertical cross-section. Furthermore, the plurality of sensor external magnets 55 are disposed in such a manner that the surface polarities of the moving magnetic bodies switch alternately between S and N. The remainder of the configuration and the manufacturing process is similar to the first to fifth embodiments. Even if a configuration of this kind is adopted, it is still possible to obtain similar beneficial effects to the first to fifth embodiments.

In FIG. 16, a mode is exemplified where the features of the sixth embodiment are combined with the first embodiment, but the sixth embodiment is not limited to FIG. 16, and may be implemented in a mode which combines the features of the sixth embodiment with any of the second to fifth embodiments.

The contents of the present invention have been specifically described above with reference to preferred embodiments, but it would be obvious to a person skilled in the art that various modifications can be made on the basis of the basic technical concepts and teachings of the present invention.

What is claimed is:

1. A rotation sensor detecting rotation of a rotary body, the sensor comprising: a case; a pair of lead frames and a magnetism detection unit, wherein the case has a bottom surface section disposed at an interval from a surface of the rotary body, and a side surface section which is connected to the bottom surface section and which, together with the bottom surface section, forms a hollow internal space;

an opening spatially connecting with the internal space is provided in the side surface section of the case on an opposite side to the bottom surface section;

an outer peripheral section of the case has a ring-shaped rib;

each of the pair of lead frames has a transmission path forming section having one end section and another end section, the transmission path forming section forming a transmission path for an electrical signal or a transmission path for electric power;

the one end section of the transmission path forming section of the pair of lead frames is inserted into the internal space of the case via the opening;

the pair of lead frames are disposed in such a manner that the another end section of the transmission path forming section projects to an outer side of the case;

the magnetism detection unit is provided at the one end section of the transmission path forming section and is accommodated in the internal space of the case;

the magnetism detection unit has magnetism detection means for detecting change in a magnetic field of a magnet provided in the rotary body or change in a magnetic field of a magnet accommodated in the internal space of the case;

the pair of lead frames respectively have positioning sections which contact the side surface section of the case when the transmission path forming section is inserted into the internal space of the case, and in this state of contact, keep an insertion depth dimension or the magnetism detection unit in the internal space of the case to a prescribed dimension;

the rotation sensor is further provided with an exterior molding section having a flange section about a periphery of the case; and a flange lower flat surface of the flange section is provided further towards a case bottom surface side than a lowermost flat surface of the ring-shaped rib, a ring-shaped portion of the lowermost flat surface of the ring-shaped rib is exposed to an empty space, and a plurality of projections are provided along an inner side surface of the side surface section which, together with the bottom surface section, forms the internal space, wherein the ring-shaped rib of the case comprises:
a first section contacting the flange section and having a first diameter, the first section comprising the lowermost flat surface of the ring-shaped rib; and
a second section contacting the flange section and having a second diameter, the second diameter being smaller than the first diameter, and wherein a ring-shaped projection, which contacts the flange section and is concentric with the ring-shaped rib, is provided on the second section and has a smaller diameter than the first diameter.

2. The rotation sensor according to claim 1, wherein all or a portion of the projections on the inner side surface of the side surface section are exposed to the internal space.

3. The rotation sensor according to claim 1, wherein
the first section of the ring-shaped rib comprises a pair of first sections having the first diameter; and
the second section is positioned between the pair of first sections.

4. The rotation sensor according to claim 1, wherein the ring-shaped projection is provided on an entire circumference of the second section of the ring-shaped rib.

5. The rotation sensor according to claim 1, wherein the first section of the ring-shaped rib comprises:
a vertical surface contacting the flange section and extending from an outermost point of the lowermost surface; and
a horizontal surface contacting the flange section and extending from an uppermost point of the vertical surface toward a radial center of the rotation sensor.

* * * * *